(12) United States Patent
Oborn et al.

(10) Patent No.: US 7,916,844 B2
(45) Date of Patent: *Mar. 29, 2011

(54) SYSTEM AND METHOD TO DETERMINE AND DELIVER QUOTES FOR DISTANCE-SENSITIVE COMMUNICATION LINKS FROM MULTIPLE SERVICE PROVIDERS

(75) Inventors: Patrick K. Oborn, Cedar Hills, UT (US); Aaron J. Lieberman, Cedar Hills, UT (US)

(73) Assignee: Telarus, Inc., Cedar Hills, UT (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/391,635

(22) Filed: Feb. 24, 2009

(65) Prior Publication Data

US 2009/0154676 A1    Jun. 18, 2009

Related U.S. Application Data

(63) Continuation of application No. 10/953,347, filed on Sep. 30, 2004, now Pat. No. 7,496,184.

(60) Provisional application No. 60/517,916, filed on Nov. 7, 2003.

(51) Int. Cl.
*H04M 15/00* (2006.01)

(52) U.S. Cl. ......... 379/114.06; 379/112.02; 379/121.02; 379/127.05

(58) Field of Classification Search ............. 379/112.07, 379/114.02, 114.03, 114.05, 114.06, 114.1, 379/114.12, 121.01, 121.02, 125, 127.04, 379/128, 130, 112.02, 127.05; 705/20, 37, 21, 24, 26, 27

See application file for complete search history.

(56) References Cited

U.S. PATENT DOCUMENTS

| | | | |
|---|---|---|---|
| 5,553,131 A | | 9/1996 | Minervino et al. |
| 5,790,642 A | | 8/1998 | Taylor et al. |
| 5,799,071 A | | 8/1998 | Azar et al. |
| 5,802,513 A | | 9/1998 | Bowie |
| 5,995,602 A | | 11/1999 | Johnson et al. |
| 6,005,925 A | | 12/1999 | Johnson et al. |
| 6,005,926 A | * | 12/1999 | Mashinsky ............... 379/114.02 |
| 6,144,727 A | * | 11/2000 | Mashinsky ............... 379/114.02 |
| 6,269,157 B1 | | 7/2001 | Coyle |
| 6,373,929 B1 | | 4/2002 | Johnson et al. |
| 6,442,258 B1 | * | 8/2002 | Mashinsky ............... 379/114.02 |
| 7,307,985 B1 | | 12/2007 | Fallis et al. |
| 7,761,363 B2 | * | 7/2010 | Penney ........................... 705/37 |
| 2002/0019786 A1 | * | 2/2002 | Gonzalez et al. ............. 705/28 |
| 2003/0004844 A1 | * | 1/2003 | Hueler ........................... 705/35 |
| 2003/0033212 A1 | * | 2/2003 | Sandhu et al. ................ 705/26 |
| 2005/0075967 A1 | * | 4/2005 | Sandhu et al. ................ 705/37 |
| 2006/0004584 A1 | * | 1/2006 | Knight ............................. 705/1 |
| 2010/0125465 A1 | * | 5/2010 | Hueler ............................. 705/4 |

* cited by examiner

*Primary Examiner* — Binh K Tieu
(74) *Attorney, Agent, or Firm* — Cooley LLP (57) ABSTRACT

To facilitate real-time pricing, an embodiment of the invention retrieves multiple quotes from multiple databases associated with multiple service providers. Information regarding a customer's location, and the locations of multiple service providers are used to determine the cost of services associated with each of the multiple service providers in real-time. The retrieved quotes are compared, and quotes below a pre-determined price threshold are provided to a user in real-time (e.g., via the Internet). The user can select a desired quote from the quotes provided, and purchase or request more information regarding the desired quote online.

20 Claims, 6 Drawing Sheets

| Service | Rebate | Install | Router | Term | Total | Details |
|---|---|---|---|---|---|---|
| Fractional T1 (384k x 384k) | $0.00 | $0.00 | Yes | 3 Years | $639.00 | details |
| Fractional T1 (384k x 384k) | $0.00 | $0.00 | Yes | 2 Years | $679.00 | details |
| Fractional T1 (384k x 384k) | $0.00 | $0.00 | Yes | 1 Year | $718.00 | details |
| Full T1 (1.5M x 1.5M) | $0.00 | $0.00 | Yes | 3 Years | $729.95 | details |
| Fractional T1 (512k x 512k) | $0.00 | $0.00 | Yes | 3 Years | $749.00 | details |
| Full T1 (1.5M x 1.5M) | $400.00 | $400.00 | Yes | 2 Years | $759.95 | details |
| Fractional T1 (768k x 768k) | $0.00 | $0.00 | Yes | 3 Years | $769.00 | details |
| Fractional T1 (512k x 512k) | $0.00 | $0.00 | Yes | 2 Years | $789.00 | details |
| Fractional T1 (768k x 768k) | $0.00 | $0.00 | Yes | 2 Years | $819.00 | details |
| Fractional T1 (512k x 512k) | $0.00 | $0.00 | Yes | 1 Year | $837.00 | details |
| Full T1 (1.5M x 1.5M) | $0.00 | $0.00 | Yes | 3 Years | $849.00 | details |
| Full T1 (1.5M x 1.5M) | $400.00 | $800.00 | Yes | 1 Year | $859.95 | details |

*Fig. 6*

SYSTEM AND METHOD TO DETERMINE AND DELIVER QUOTES FOR DISTANCE-SENSITIVE COMMUNICATION LINKS FROM MULTIPLE SERVICE PROVIDERS

CROSS-REFERENCE TO RELATED APPLICATION

This application claims priority to and is a continuation of U.S. patent application Ser. No. 10/953,347, filed on Sep. 30, 2004 now U.S. Pat. No. 7,496,184, and entitled "SYSTEM AND METHOD TO DETERMINE AND DELIVER QUOTES FOR DISTANCE-SENSITIVE COMMUNICATION LINKS FROM MULTIPLE SERVICE PROVIDERS," which claims priority to U.S. Provisional Patent Application No. 60/517,916, filed on Nov. 7, 2003, and entitled "SYSTEM AND METHOD TO CALCULATE AND DELIVER QUOTES FOR DISTANCE-SENSITIVE COMMUNICATION LINKS FROM MULTIPLE SERVICE PROVIDERS;" each of which is incorporated herein by reference in its entirety.

FIELD OF THE INVENTION

The invention relates generally to providing quotes for communications services. More specifically, the invention relates to providing quotes for distance-sensitive communication links from multiple service providers.

BACKGROUND

In the field of telecommunications, there currently exists no means by which customers can obtain real-time price quotes for distance-sensitive communication links, such as dedicated voice and/or data services over T1 lines, including, for example, fractional T1, full T1, DS1, T3, DS3, and so forth. For T1 loops, for example, each product vendor maintains its own internal, and in many cases proprietary, database information and interface software capable of providing the price of a T1 loop based on the telephone number and physical address of a customer. The price of T1 loops is "distance-sensitive," or in other words, the price is dependent upon the geographical distance from the service location (e.g., a customer's location) to the nearest Point of Presence (POP). Loop pricing can also vary based on a local telephone company and/or service area.

Typically, only in-house agent managers and technicians have access to this T1 pricing software, which is only capable of providing pricing for T1 loops for areas serviced by their own company. Additionally, any proprietary information contained in the company's databases is typically only available to such in-house personnel. Each T1 vendor generally attempts to prevent competitors from accessing their pricing software or proprietary databases.

Sales agents of T1 vendors usually must contact in-house agent managers for pricing information. Some vendors allow agents to gain access to the pricing system through a password-protected agent back office web site. Agents who want to gather prices of various T1 vendors must contact each vendor individually (either via in-house agent managers or agent back office web sites) and wait for these companies to respond with their pricing information.

With such a vast, segmented distribution of T1 loop price quote mechanisms, a sales agent attempting to compare pricing information (e.g., in an attempt to find the most cost-effective provider) often has no choice but to contact each vendor individually through a sales agent or agent back-office web site, and wait for the respective agent manager or web site to provide a price quote (from their own proprietary software and/or databases).

Accordingly, it would be desirable to develop a system for calculating and delivering real-time price quotes for distance-sensitive communication links, such as T1 service, to customers and/or their sales agents. Additionally, it would be desirable to provide real-time price quotes to customers or their sales agents from multiple service providers.

SUMMARY

An embodiment of the invention provides a system and method to determine and deliver price quotes for distance-sensitive communication links from multiple service providers. Specifically, a method sends a service request to a first service provider and a service request to a second service provider. Information associated with a distance-sensitive communication link of the first service provider is received in response to the service request sent to the first service provider. Information associated with a distance-sensitive communication link of the second service provider is received in response to the service request sent to the second service provider. Information that is based on the information associated with the distance-sensitive communication link of the first service provider and the information associated with the distance-sensitive communication link of the second service provider is output.

According to another embodiment of the invention, a method receives customer location information and calculates a distance between a service point of a first service provider and a customer location associated with the customer location information. The method determines, substantially in real-time with the calculating, a price associated with the first service provider for the calculated distance. The method can also optionally calculate a distance between a service point of a second service provider and the customer location associated with the customer location information and determine, substantially in real-time with the calculating for the first service provider and/or the calculating for the second service provider, a price associated with the second service provider for the calculated distance associated with the second service provider. Additionally, the method can optionally output the price associated with the first service provider and the price associated with the second service provider.

According to another embodiment of the invention, an apparatus is provided that includes a quote compiler configured to retrieve information associated with a distance-sensitive communication link of each service provider from multiple service providers. The quote compiler is configured to determine multiple prices based at least in part on the retrieved information and information associated with a customer. Each price from the multiple prices is uniquely associated with service for the customer from each service provider from the multiple service providers. The quote compiler is configured to output the multiple prices. The apparatus can optionally include one or more databases and/or a user interface in communication with the quote compiler.

Further features of some embodiments of the invention, and the advantages offered thereby, are explained in greater detail hereinafter with reference to the specific embodiments illustrated in the accompanying drawings, wherein like elements are indicated using like reference designators.

DETAILED DESCRIPTION

An embodiment of the invention is described in the context of a system and method to determine and deliver quotes for distance-sensitive communication links from multiple service providers or vendors. For example, an embodiment of the invention provides quotes for T1 loop prices from multiple vendors.

For example, a method according to an embodiment of the invention receives customer location information and calculates or otherwise determines at least one distance from a customer to a location of at least one service point (e.g., a POP location) of at least one service provider. The method determines in real-time at least one price associated with the corresponding at least one calculated distance and outputs the at least one determined price.

An embodiment of the invention provides multiple price quotes (e.g., from multiple vendors or service providers) approximately simultaneously through geomapping and database standardization techniques using, for example, structured query language (SQL) and/or extensible markup language (XML) queries. According to one or more embodiments of the invention, price quotes are provided for T1 loops from multiple service providers or vendors.

To facilitate real-time pricing, an embodiment of the invention makes use of a standardized database architecture to retrieve multiple quotes from multiple databases, where each quote is associated with a different service provider or vendor. Information regarding a customer's location, and the locations of service points (e.g., POP locations) of multiple service providers is used to determine the cost of services associated with each of the multiple service providers. The retrieved quotes are compared, and a group of quotes below a pre-determined price threshold are provided to a user (e.g., a customer, sales agent, etc.) in real-time. These quotes can be provided to a user via the Internet (e.g., via an electronic mail message, a web page, or other electronic communication), and can be displayed in an easily read format (e.g., in ascending-price order from the lowest price to the highest price). The user can select a desired quote from an output list of quotes, and request additional information or express an interest in purchasing service at the price expressed in the desired quote online.

The terms "customer" and "user" can represent multiple individuals associated with a price quote system according to one or more embodiments of the invention. For the sake of brevity and simplicity, the terms "customer" and "user" are used herein with specific meanings. A "customer" is the potential beneficiary of communications service(s) to whom price quotes are ultimately intended to apply. That is, the customer is the person who will pay the price(s) delivered in the price quote to use the desired communications service(s). A "user" operates the price quote system described herein to create price quotes for the customer. A user can include, for example, a sales agent, a sub-agent, a system administrator, or the customer. Thus, the customer can also be the user of the price quote system, creating the customer's own price quotes. Moreover, the user can be charged (but may not be) for use of the price quote system, even if that user is not the ultimate beneficiary of the communications service(s).

According to an embodiment of the invention, the quotes are facilitated by a system and method that is capable of geomapping the U.S. location of any customer into telecommunication vertical (V) and horizontal (H) coordinates (referred to collectively as "V/H coordinates" herein) using: (1) numbering plan area code (NPA) information in combination with the first three digits of the telephone number (i.e., the prefix), which is expressed as NXX in the syntax of the North American numbering plan (NANP) syntax (expressed together as NPA-NXX); and (2) physical address information (e.g., street address, city, state, zip code) of the customer. The nearest central office (CO) to the customer, which is generally the telecommunication substation that provides the customer with dial-tone service, is determined, and the V/H coordinates for the customer's central office (CO) are calculated.

For many T1 loop calculations, the distance from the customer's central office (CO) to the location of the point of presence (POP) of one or more T1 service providers is relevant. Based upon the calculated distance from the customer's central office (CO) to each point of presence (POP), a price quote can be generated for each provider using a pricing matrix that has pricing information for each individual provider. This pricing information can be provided, for example, as a function of distance from the customer's central office (CO) to the point of presence (POP).

Additional considerations can also be taken into account in providing price quotes, such as special rates, rebates, promotions, and the like. Information regarding these additional considerations can be obtained, for example, using real-time XML queries to each of the individual vendors. For the convenience of a user of the system, all of the data generated for each product vendor and can be assimilated into a single price quote. The price quotes for each of the vendors can be ranked according to price or some other parameter, and output in a graphical array (e.g., a table) in a manner that is convenient and easy to understand. The final results of each quote procedure can be stored in a separate database where a user, such as a customer, sales agent assigned to the quote, system administrators, and other designated personnel have access to the information. A user can select and express interest in a desired service plan online via an integrated order and price quote-tracking database. Additionally, according to one or more embodiments of the invention, the user can purchase a desired service plan online using information stored by an integrated order and price quote-tracking database.

According to an embodiment of the invention, users can shop for T1 service in real-time. Users can also shop for fractional T1 service, burstable T1 service, voice service over T1, data service over T1, digital system cross-connect (DSX) service, object linking and embedding (OLE) control extensions (OCX) service, digital subscriber line (DSL) service, and other services offered by one or more of the vendors queried. The inclusion of future product vendors and/or services is also possible.

According to an embodiment of the invention, various databases can be accessed to provide users with the best possible rate quote. For example, a CO database containing information for every central office operating in the United States, as defined by the North American numbering plan (NANP) and the local access transport area (LATA), which define areas within which calls are handled by local telephone companies, can be provided. Additionally, for example, a location database that maps each CO to a physical V/H coordinate can be used.

A database storing common language location identifier (CLLI) information, which is an identifier of a telephone switch or calling area formatted in the American standard code for information interchange (ASCII), can also be provided. According to an embodiment of the invention, a CLLI database that details the location (in V/H coordinates) and serviceability of each POP in a vendor's network can be provided. Additionally, a complete pricing matrix that outlines the price-per-mile breakdown for each vendor's service line is provided according to an embodiment of the invention.

An embodiment of the invention includes a service package database, which contains information for each customer, such as terms of service, length of contract, applicable installation fees and/or rebates, equipment costs, and so forth, for each product and service line. Additionally, a customer database is provided where information regarding customers is stored for use by customers, sales agents assigned to the quote, system administrators, and other designated personnel that have access to the information. A quote database where generated quotes and/or order information is stored for future reference by customers, in-house sales agents, system administrators, and other designated personal can also be used, according to an embodiment of the invention.

In an alternative embodiment, a dynamic data retrieval capability is provided using, for example, XML commands to dynamically retrieve information from vendors who maintain their own CLLI and service package databases, as well as pricing information (e.g., within a price database), which could be used in place of the pricing matrix mentioned above. The dynamic data retrieval capability can be used in place of or in addition to local databases.

A quote compiler (described in greater detail below) can assimilate information from one or more of the databases mentioned above (including information dynamically retrieved from one or more vendors) to provide real-time customer quotes, according to an embodiment of the invention. Each quote is generated dynamically to ensure the most up-to-date system parameters are being employed.

Figure 1:
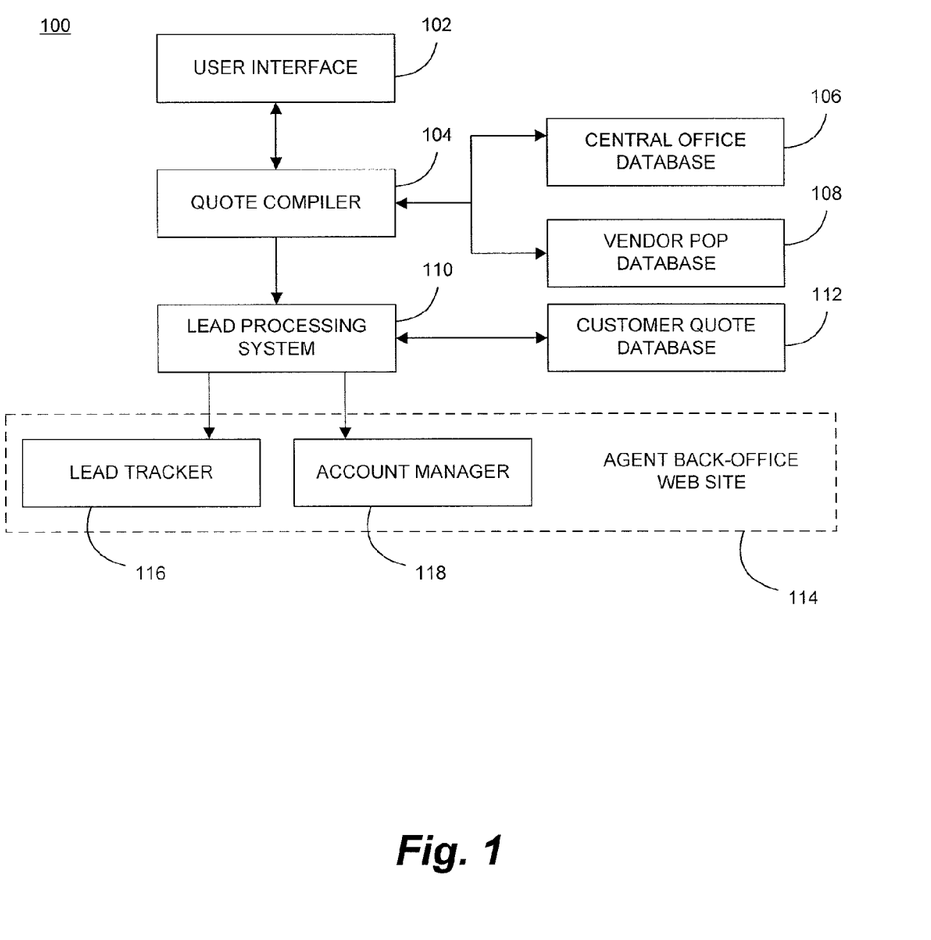
FIG. 1 is block diagram of a price quote system according to an embodiment of the invention.

FIG. 1 is block diagram of a price quote system 100 according to an embodiment of the invention. Specifically, FIG. 1 shows a price quote system 100 for providing users with real-time quotes, and for allowing users to select and purchase services online. FIG. 1 includes a user interface 102, by which a user enters information, and receives information communicated from the system 100. Many types of information can be communicated to and/or from the user via the user interface 102. Some examples of such information are given in greater detail below in connection with FIG. 6.

Information communicated to the system from the user via the user interface 102 is provided to the quote compiler 104, which is in communication with a variety of databases 106, 108, as well as a lead processing system 110. The quote compiler 104 queries the central office (CO) database 106 and the vendor point of presence (POP) database 108 to obtain information regarding the nearest CO and POPs so that a distance can be determined and a corresponding price quote compiled for a customer. Additionally, the quote compiler can determine "a la carte" style promotions or other promotional features associated with a specific provider, communication loop, or service, which can be included in a price quote as desired.

When a price quote has been compiled, the information can be communicated to the user via the user interface 102 or by other suitable means. The price quote can be sent to the user via the user interface along with any additional information (e.g., required application forms, service agreements, credit applications, promotional materials, etc.), as desired or required by the provider. Alternatively, such additional information can be sent to a sales agent via the account manager 118 described below.

The quote compiler 104, upon retrieving the necessary information from the various databases 106, 108, calculates pricing information for one or more vendors, formats the results, and communicates the results to the user via the user interface 102. The manner in which the quote compiler 104 uses the information from the various databases, formats that information, and provides the information to a user is described in greater detail below.

Once the information has been presented to the user (e.g., via the user interface 102, an electronic network communication, etc.), the user then can select a desired service plan and optionally purchase that service plan (e.g., online via the user interface 102, via an electronic network connection, etc.). Information regarding any quotes provided to a user via the user interface 102, as well as any information regarding purchases made by a user, is provided to the lead processing system 110, which stores that information in the customer quote database 112, and provides relevant information about the customer to the agent back-office web site 114. Specifically, information is provided from the lead processing system 110 to a lead tracker 116 and/or to an account manager 118. The lead tracker 116 is responsible for allowing referral/marketing agents a dynamic ability to follow the progress of their leads (i.e., customers who requested quotes using a unique tracking code).

The account manager 118 allows professional, qualified, pre-screened sales agents access to the entire customer quote and provides a customer relationship management capability that allows sales agents to append, edit, and modify quote records as needed. For example, according to one or more embodiments of the invention, the account manager 118, or other component of the quote system 100 can provide sales agents with additional information regarding referrals and potential customers, such as potential sales agent commissions for opening an account. Additionally, the account manager 118, or other component of the quote system can provide additional information for a particular user or service provider (e.g., required application forms, service agreements, credit applications, promotional materials, etc.), as desired or required by a service provider. Commission rates may vary for the different vendors or different price quotes depending upon a variety of factors, and the quote system 100 can process quotes that include these various commission rates or provide information regarding the quotes to a sales agent, system administrator, or other individual using the quote system 100.

It will be appreciated that the various components illustrated in FIG. 1 can be collocated, or located remotely from one another. For example, according to an embodiment, the user interface 102 can provide a user access via a communications network, such as the Internet, a large area network (LAN), a wide area network (WAN), a wireless LAN (WLAN), or other suitable communications network. Additionally, each of the databases shown in FIG. 1 can represent one or more databases either collocated with, or remotely located from, the quote compiler 104 and other elements of the price quote system 100.

Figure 2:
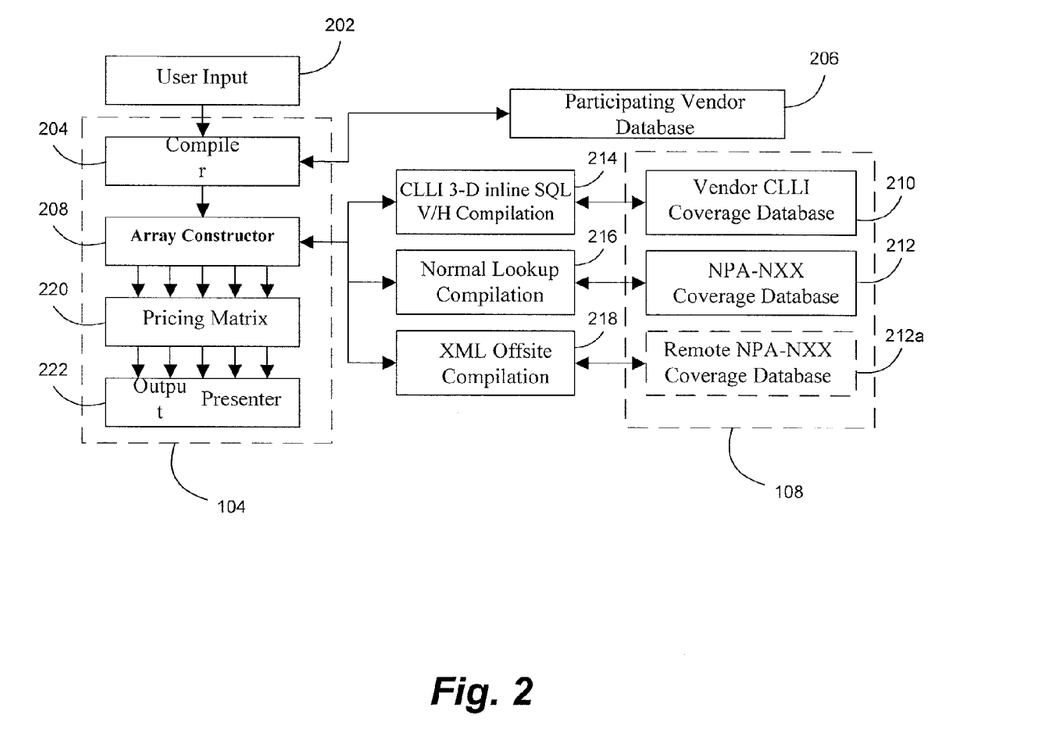
FIG. 2 is a diagram of the information flow of the system shown in FIG. 1, according to an embodiment of the invention.

FIG. 2 is a diagram of the information flow diagram for the price quote system 100 (shown in FIG. 1), according to an embodiment of the invention. In FIG. 2, user input 202, which includes customer information (e.g., customer location information), is provided to a compiler 204, which is part of the quote compiler 104 (also shown in FIG. 1). This compiler 204 is configured to communicate information to and receive information from a participating vendor database 206 after the vendor database 206 is created.

After the compiler 204 receives the user input 202, a participating vendor database 206 is created. This participating vendor database 206 can be based on preferences, such as user, customer, and/or marketing preferences, for example. According to an embodiment of the invention, individual marketing agents of the price quote system 100 (shown in FIG. 1) can set preferences within the participating vendor database 206. For example, each vendor with whom business is conducted can be stored in this database 206 with an associated "ON" or "OFF" preference. The vendor preference field allows vendors to be selectively presented to users of the system. For example, according to an embodiment of the invention, when an "OFF" preference is associated with a vendor, that vendor can be excluded from the results presented to a customer (even if service is available through the excluded vendor), while vendors having an "ON" preference associated with them will be included in the results presented to a customer. The "ON" and "OFF" preferences can be used, for example, to prevent contractual or other conflicts with a particular vendor. According to one or more embodiments, an agent that provides quote information to the quote compiler 104 can provide these "ON" and "OFF" preferences. Vendors can be removed from the database 206 by marketing agents, system administrators, or other authorized individuals using a password protected web control panel, for example.

Below is a sample of a database table from the participating vendor database 206 containing a single entry. Although a limited number of entries (e.g., a single entry) is shown for each sample database table shown below, each database table can include multiple entries, as desired and appropriate to store the information of those tables. The sample table from the vendor database 206 contains a vendor number, which uniquely identifies each vendor in the database 206, the vendor's name, a sub-agent identification (e.g., a username) of the agent who is marketing and/or advertising the site, and a preference associated with that vendor.

| Vendor Number | Vendor Name | Sub-Agent ID | Preference |
|---|---|---|---|
| 1 | Sprint | poborn | ON |

Information from the participating vendor database 206, along with user input 202, are provided to an array constructor 208, which communicates with a number of databases. Specifically, the array constructor 208 communicates with the vendor POP database 108 (also shown in FIG. 1), which can include a number of individual databases. More specifically, the vendor POP database 108 can include, for example, a vendor CLLI coverage database 210, an NPA-NXX coverage database 212, and/or a remotely located NPA-NXX coverage database 212a (an optional database indicated by a dashed box).

According to an embodiment of the invention, after the participating vendor list is determined from database 206, each vendor is subcategorized according to the method of computation required to generate pricing from that vendor. Three examples of methods that can be implemented to generate pricing information include: looking up vendor information in the vendor CLLI coverage database 210, looking up vendor information in the NPA-NXX coverage database 212, and dynamically retrieving information from an off-site vendor NPA-NXX database 212a.

According to an embodiment of the invention, the information retrieved from the vendor CLLI coverage database 210 can be retrieved using a SQL lookup query. For example, a three-dimensional (3-D) lookup query, including inline calculations, or other data manipulation to be performed simultaneously within a single SQL call, can also be used.

The various compilation blocks 214, 216, 218 shown in FIG. 2 are functional blocks, and are not components of a particular system. Rather, these compilation blocks 214, 216, 218 describe the functional manner in which an array of vendors is compiled from data in the various databases 210, 212, 212a of the POP database 108 (shown in FIG. 1) by the array constructor 208.

Which database 210, 212, 212a is queried by the array constructor 208 depends on the particular vendor and the type or subcategory of database available for that vendor. For example, if conversion to V/H coordinates is necessary, a CLLI three-dimensional (3-D) inline SQL V/H compilation 214 occurs to retrieve data contained in the vendor CLLI coverage database 210. Generally, when NPA-NXX information is sufficient, the NPA-NXX coverage database 212 is queried via a normal lookup compilation 216. Some vendors prefer to maintain pricing information in-house, and will provide agents with access to a remote NPA-NXX coverage database 212a. Queries to this coverage database 212a can be performed by way of an XML off-site compilation 218. This can also be referred to as a dynamic data retrieval or an XML handshake.

According to an embodiment of the invention, looking up information in the vendor CLLI coverage database 210 can involve several subroutines. For example, the V/H coordinate of the customer's CO can first be determined, and then the nearest POP location for a first vendor can be determined. After the nearest POP location for the first vendor has been determined, the closest POP location for a second vendor is determined. This process is repeated until all the POP locations closest to the customer and/or the customer's CO for each vendor using this lookup type (i.e., using the CLLI coverage database 210) have been determined.

The V/H coordinates are looked up in a table in the CO database 106 (shown in FIG. 1) using the NPA and NXX of the customer as lookup parameters. Below is an example of a sample set of a single line of data as it might appear in a table of the CO database 106. This sample data identifies the CLLI information, V/H coordinates, and the LATA information associated with each area code (NPA) and exchange (NXX) combination.

| NPA | NXX | CLLI | V | H | LATA |
|---|---|---|---|---|---|
| 909 | 606 | LSSRCAXF9J | 9215 | 7775 | 730 |

The sample table of the CO database 106 shown above can, for example, contain and be queried for every functioning area code and prefix (i.e., exchange information) in the United States. Generally, the list is updated regularly (e.g., approximately every 90 days) so that changes (e.g., area code splits, new exchange assignments, etc.) are reflected in the table. Each CO can generally serve, for example, up to about fifty NPA-NXX combinations depending on customer density for that CO.

Once the V/H coordinates of the customer's CO are known (e.g., once they are calculated as described in detail below), a multi-dimensional (e.g., three-dimensional, four-dimensional, etc.) SQL lookup can be used to determine the closest POP location for each respective vendor. An example of a table from the vendor CLLI coverage database 212 is shown below. This sample table identifies a unique company identification (ID), the POP CLLI information, V/H coordinate information, LATA information, and available services information associated with each company or vendor in the table.

| Company ID | POP CLLI | V | H | LATA | Services |
|---|---|---|---|---|---|
| 1 | LSSRCA | 9216 | 7774 | 730 | T1, DS3 |

The three-dimensional SQL lookup statement dynamically queries data from the table and employs the Pythagorean theorem and scaling factors so that the CLLI of the closest POP as well as the distance between the CO and the POP (in miles) are available as results of the query. Below is an example of a three-dimensional query that can be used to retrieve data from the table and operate on the data dynamically using the Pythagorean theorem.
SELECT SQRT(square($H_{CO}-H_{POP}$)+square($V_{CO}-V_{POP}$))/ 3.1623 AS distance,*FROM VendorCLLI This query is referred to as a three-dimensional (3-D) lookup because three unique parameters are simultaneously employed: the vertical coordinate difference ($V_{CO}-V_{POP}$), the horizontal coordinate difference ($H_{CO}-H_{POP}$), and the overall distance (i.e., the hypotenuse of the right triangle), representing all three sides of a right triangle. Once the distances have been determined for all POP CLLIs using this lookup method, the one with the smallest distance is selected and passed to the pricing matrix 220.

The three-dimensional query shown above can be used with additional query language and/or parameters (e.g., as part of a multi-dimensional query). For example, query language can be used in connection with a multi-dimensional query to order or otherwise filter results of the multi-dimensional query according to one or more parameters (e.g., parameters in a table from the vendor CLLI coverage database 212). For example, results can be filtered according to the associated LATA (e.g., only results within the same LATA as a customer are displayed). Additionally, or alternatively, results of the multi-dimensional query above can be ordered in either ascending or descending order according to the "Company ID" values associated with the results. The results can also be ordered according to distance from the customer. For example, the multi-dimensional query can be executed on the smallest distance (e.g., between the CO and the POP) first, followed by the next-smallest distance, and so on until the multi-dimensional query has been executed for all distances across all carriers.

The three-dimensional query shown above can be used in connection with one or more constraining or filtering statements (e.g., as a multi-dimensional query), such as the example shown below.
WHERE (Distance=(SELECT MIN (Distance))
The filtering statement immediately above acts as a filter for the three-dimensional query shown and discussed above, causing the three-dimensional query to operate first on the minimum distance. In the statement above, the variable "Distance" can be any distance calculation, or any portion of a distance calculation (e.g., a portion of the distance formula, etc.). Similar statements can be used to filter the three-dimensional query by mileage (e.g., as contained in an NPA-NXX database 212, 212a, supplied by the vendor, computed, etc.), by LATA, or by any other suitable value (e.g., a Company ID, a Record ID, etc.).

Information can also be dynamically retrieved from a remotely located NPA-NXX database 212a using, for example, an XML handshake technique. This technique can be used in situations where T1 vendors maintain needed T1 computation algorithms or techniques and databases centralized on servers under their direct control. Such vendors can establish XML protocols to facilitate an exchange of information, while still maintaining direct control of the algorithms and databases. According to an embodiment of the invention, an XML query used in an XML handshake technique can include one or more of the following pieces of information: NPA information, NXX information, a customer's physical address, a customer's city, a customer's state, and a customer's zip code. Using one or more of these parameters, the vendor's software can determine the rate plans available from the vendor at the customer's location and transmit these plans back to the array constructor 208. Other dynamic query techniques, or handshake techniques can likewise be used to accomplish the transfer of information from agent to vendor and vice versa, such as hypertext transfer protocol (HTTP) post, HTTP get, file transfer protocol (FTP), application programming interface (API), and other techniques. According to an embodiment of the invention, information received via an XML handshake technique or another dynamic retrieval technique can be parsed and sent directly to the array presenter 222, bypassing the pricing matrix 220.

Once an array of available vendor data has been constructed, that information can be provided to a pricing matrix 220, which can calculate prices for each of the vendors within the array. When the pricing calculations have been performed using the pricing matrix 220, the array is output by way of an output presenter 222. As mentioned above, the information can be formatted and presented to a user in a manner easily understood by the user, and in a manner that facilitates selection and online purchase of a desired service by the user (e.g., a web page or other electronic communication, such as electronic mail, etc.). The manner in which the information is presented will be described in greater detail below with reference to FIG. 6.

Figure 3:
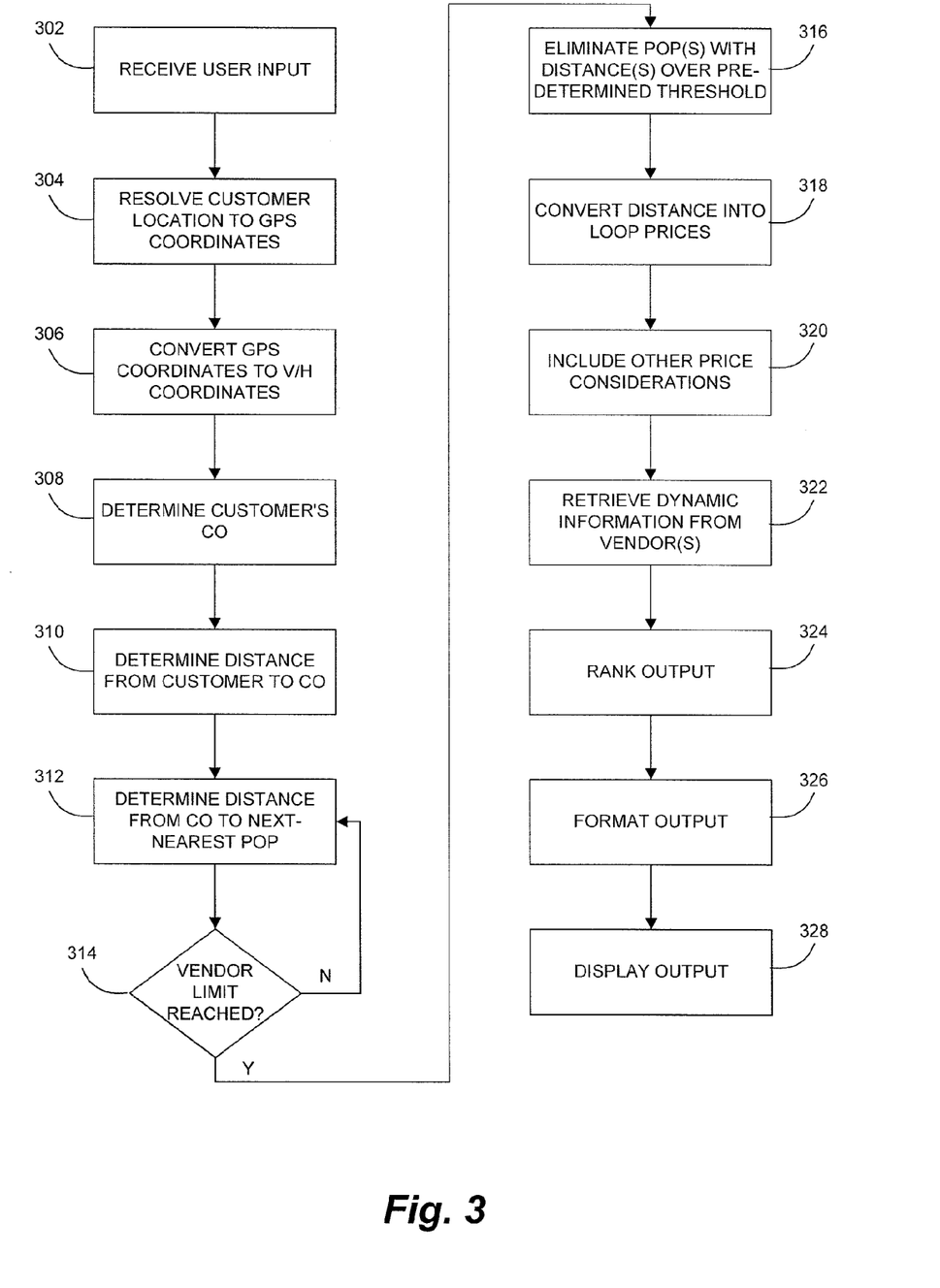
FIG. 3 is a flow diagram for providing a price quote according to an embodiment of the invention.

FIG. 3 is a flow diagram for providing a price quote according to an embodiment of the invention. The process shown in the flow diagram of FIG. 3 describes in detail how the price quote system 100 shown in FIG. 1 provides the user with one or more price quotes from one or more vendors.

First, in step 302, user input is received. The user input can include, for example, customer information such as area code and exchange information (i.e., NPA-NXX information), street address, city name, state name, zip code information, and other suitable information for determining the location of a customer. After receiving the user input in step 302, the customer's location is resolved using a ranging system capable of determining the latitude and longitude of the customer's location in step 304. For example, in accordance with an embodiment of the invention, the global positioning system (GPS) is used to determine GPS coordinates of the customer's location in step 304. Determining the customer's location can be accomplished by calculation, measurement, or by data from commercially available databases. For example, the United States Postal Service maintains a regularly updated, publicly accessible database with the latitude and longitude of every location in the United States.

The GPS coordinates (or alternatively, coordinates from some other ranging system) then are converted to coordinates that can be used to measure distance between two points on a substantially spherical surface or ellipsoidal surface. For example, according to an embodiment of the invention, the GPS coordinates can be converted to V/H coordinates in step 306, such as those shown in FIG. 4 (described in greater detail below). One technique for converting from latitude and longitude to V/H coordinates is discussed below in detail in connection with the flow diagram shown in FIG. 5. Because the pricing of T1 service and other services, such as DSL service, is often highly distance-sensitive and can require a resolution on the order of about 0.1 miles, conversion to a flat geometry, representing a projection of the spherical or ellipsoidal coordinates is effective.

In step 308 of FIG. 3, the customer's CO (e.g., the CO geographically closest to the customer) is determined. This may be accomplished, for example, using input from a user, such as the customer's NPA-NXX information, as well as information from a national CO database (e.g., the CO database 106, shown in FIG. 1). Generally this information is available in the CO database 106 in V/H coordinates; however, if this information is not available in V/H coordinates, or other similar coordinates, the same or similar conversion from latitude and longitude to V/H coordinates performed for the customer's location can be performed to determine the V/H coordinates of the CO. Generally, when the CO location is stored in V/H coordinates, it can be retrieved using either a simple or a multi-dimensional inline query (e.g., a SQL or XML query)

Once the customer's CO has been determined in step 308, the distance from the customer to the CO is determined in step 310. For example, using the V/H coordinates of the customer and the V/H coordinates of the customer's servicing CO, the distance between the two can be determined by the following formula, where the factor 3.1623 is used to convert to miles from V/H coordinate units (i.e., each V/H coordinate unit is 3.1623 miles):

$$\text{Distance(in miles)} = \text{sqrt}((V_{CO} - V_{POP})^2 + (H_{CO} - H_{POP})^2)/3.1623.$$

The distance from the customer's CO to the next-nearest T1 vendor's POP is determined in step 312, and is repeated until, for example, a pre-determined limit for the number of vendors to be queried is reached, as determined in step 314. The V/H coordinate information of the next-nearest POP can be determined via lookup in a vendor POP database 112, for example, or can alternatively be calculated using the transform shown above. Using the V/H coordinates of the customer's CO and the V/H coordinates of the T1 vendor POP (e.g., obtained via the POP database lookup), a distance can be determined using the distance formula shown above.

According to an embodiment of the invention, a separate table within a database can be created for each vendor for which quotes are to be obtained. Each of these database tables can contain information relevant to that particular vendor, such as the CLLI code, city name, state location, local exchange carrier information, and V/H coordinate information. Thus, with a simple list of CLLI codes, the information from the CO database 106 can be used to expand the list to include every NPA-NXX served.

As shown in FIG. 3, the distance to each next-nearest POP is determined until it has been determined in step 314 that the pre-determined vendor limit has been reached. In other words, the distance to the closest POP is determined, then the distance to the next-closest (i.e., the second-closest) POP is determined, followed by the distance to the next-closest (i.e., the third-closest), and so forth until the pre-determined vendor limit is reached. All of the distances determined are then stored into an array.

In step 316, all vendors (e.g., T1 vendors, etc.) that do not have a POP within a pre-determined threshold distance from the customer are eliminated from the array containing vendor information. According to an embodiment of the invention involving T1 vendors, the pre-determined threshold distance is approximately fifty miles because many T1 vendors do not offer service to customers who do not live within fifty miles of the vendor's closest POP. According to an alternative embodiment of the invention, step 316 can be optional, and all POPs for which distance has been determined can be used for price quotes, without eliminating any POPs.

In step 318, distance (e.g., mileage) is converted into loop prices for each vendor. Each T1 vendor generally determines prices for T1 loops using their own formula. This information for each vendor is contained within the pricing matrix 220, discussed above in connection with FIG. 2. Alternatively, this information can be obtained dynamically from vendors that make the information available for dynamic queries, such as the XML handshake technique described above. By way of either the pricing matrix 220 or dynamic queries, the distances from the customer to the CO and from the CO to the POP are converted to prices.

A simplified example of a pricing matrix 220 is shown in the table below.

| Distance | Cost |
|---|---|
| 0-5 miles | $200/month |
| 5-10 miles | $250/month |
| 10-20 miles | $300/month |
| 20-30 miles | $350/month |
| 30-40 miles | $400/month |
| 40-50 miles | $450/month |

Some T1 vendors that have smaller footprints can deliver lists of the NPA-NXX combinations that they serve, along with corresponding prices for customers who are located within predefined areas associated with various combinations. According to an embodiment of the invention, this information can be stored locally, or queried dynamically from a remotely located database. Two sample tables that can be used for pricing lookups are shown below. Each of these tables contains a unique company identification number, POP CLLI information, NPA information, NXX information, and information regarding services associated with each company or vendor. The first sample table below provides mileage associated with each NPA-NXX combination for price calculation purposes and the second provides a defined rate plan associated with each NPA-NXX combination.

| Company ID | POP CLLI | NPA | NXX | Mileage | Services |
|---|---|---|---|---|---|
| 1 | LSSRCA | 909 | 606 | 4.5 miles | T1, DS3 |

| Company ID | POP CLLI | NPA | NXX | Rate Plan | Services |
|---|---|---|---|---|---|
| 1 | LSSRCA | 909 | 606 | Plan 1 | T1, DS3 |

Once the NPA-NXX of the customer is used to determine the mileage, rate plan, or any other unique pricing identifier, the pricing information is sent to the pricing matrix 220 and the lookup process is repeated for all vendors who require a pricing calculation.

Any other price considerations are included in the prices associated with each vendor in step 320. These additional price considerations (if any) are included in the price quotes for each vendor provided to the user via the user interface 102. According to an embodiment of the invention, a database containing vendor-specific information (e.g., a service package database), which includes information regarding basic terms and other price considerations associated with each vendor, can be used in step 320. For example, such a database can include terms of service, length of contract, applicable installation fees and/or rebates, equipment costs, and so forth for each product and service line. This information can be stored, for example, by a vendor using a unique vendor identification number (Vendor ID). Each vendor's loop price and any other price considerations (e.g., the service package) associated with each vendor can be easily combined by using a SQL "join" lookup, for example, or some other suitable combining command or method.

In step 322, dynamic information is retrieved from vendors who make such information available. This can be accomplished, for example, using the XML handshake technique described above, with XML-enabled vendors. As discussed in connection with the NPA-NXX coverage database 212a shown in FIG. 2, some providers may allow real-time access of information via dynamic inquiries, such as XML, or the like. This can be in place of or in addition to a local database query. Information obtained dynamically for certain vendors is interpreted and stored into the master array with the results for other vendors. Step 322 is not required, and can be performed for one or more vendors for which such queries are available. Data obtained using such dynamic information retrieval techniques can come in a variety of formats and can be interpreted from multiple possible result formats.

The array containing price information is ranked in step 324 according to pre-determined parameters and is formatted in step 326 according to a pre-determined format. According to an embodiment of the invention, after all of the results have been calculated, each pricing plan is sorted and ranked according to a monthly recurring charge associated with the corresponding vendor. This can be accomplished, for example, in two steps: (1) writing each price quote into a database; and (2) reading out each quote line, beginning with the lowest price and ending with the highest price. Alternatively, ranking and/or formatting can be performed by rearranging the results within the array in which they are stored, and outputting the results beginning with the lowest price and ending with the highest price.

Figure 6:
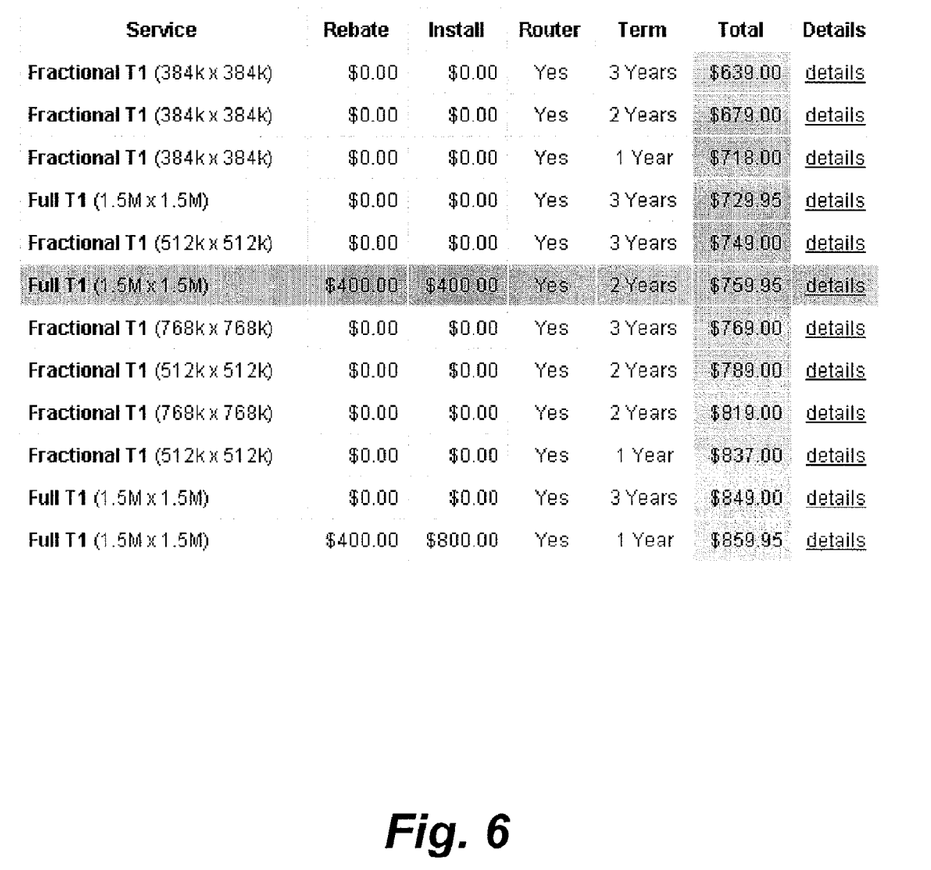
FIG. 6 is a table used to output rate quotes in a graphical user interface (GUI) according to an embodiment of the invention.

Once the price information has been ranked and formatted, it can be output (e.g., displayed, transmitted, etc.) to a user in step 328. According to an embodiment of the invention, the price information can be output in a form readily accessible by a user, such as a table. An example table by which such information can be output to a user is shown in FIG. 6, and discussed in greater detail below. Such a table can be transmitted electronically to a user (e.g., via a web site, electronic communication, etc.).

Figure 4:
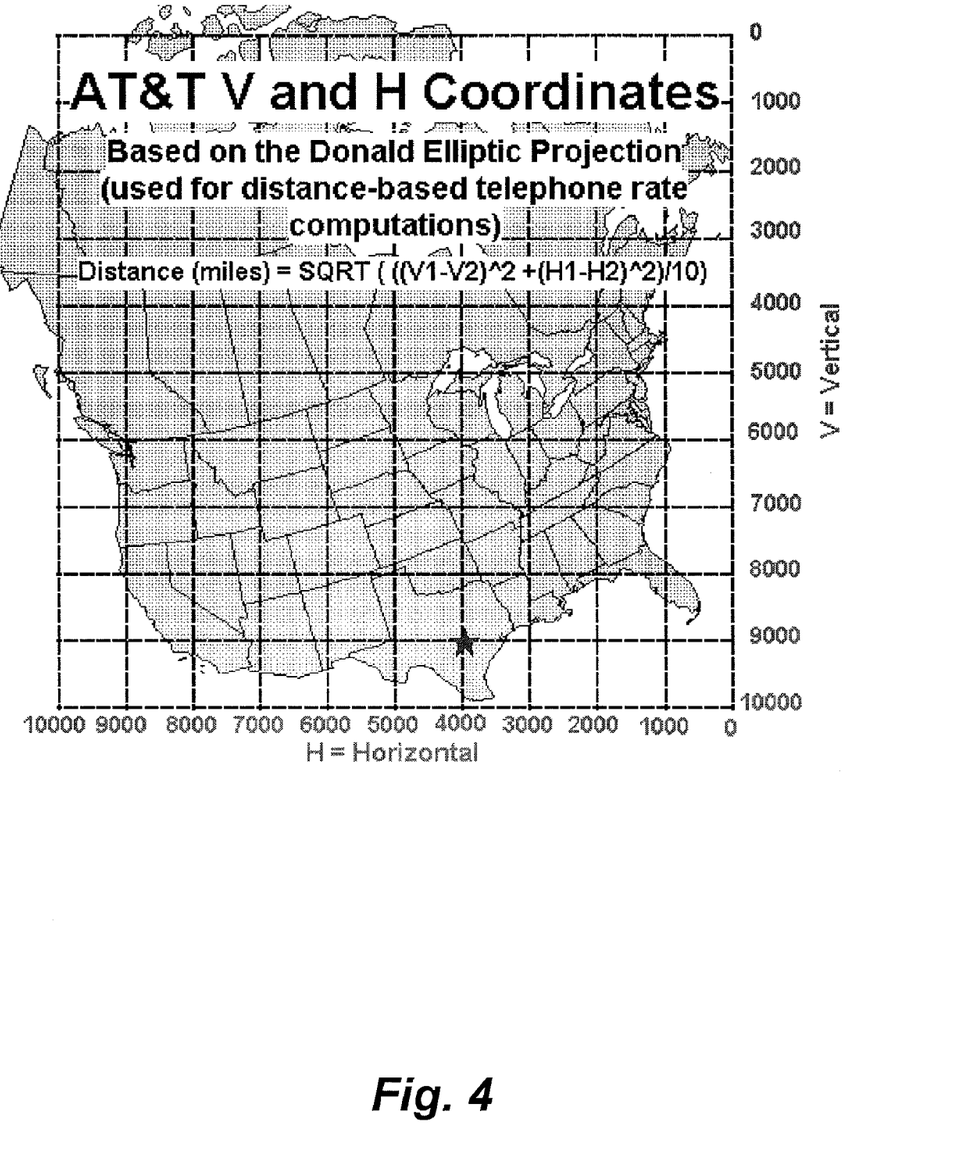
FIG. 4 is a diagram of the V/H coordinates used according to an embodiment of the invention.

FIG. 4 is a diagram of the V/H coordinates used according to an embodiment of the invention. The V/H coordinates shown in FIG. 4 are used to essentially "flatten out" the North American continent using an elliptical or "doubly equidistant" projection (scaled down by a factor of 0.003 to balance errors) to provide accurate distances between points on the surface of the continent. The foci of the projection, from which distances are measured accurately (except for the scale correction), are at 37 d 42 m 14.69 s N, 82 d 39 m 15.27 s W (in Floyd Co., Ky.) and 41 d 02 m 55.53 s N, 112 d 03 m 39.35 W (in Webster Co., Utah). This V/H coordinate system is used in the telecommunications industry, and each service vendor generally stores the location of its POPs in V/H coordinates. Similarly, the location of each CO is also generally stored in V/H coordinates. Thus, to calculate exact mileage between a customer and the nearest CO and/or POP, the customer's physical address can be converted to V/H coordinates.

Figure 5:
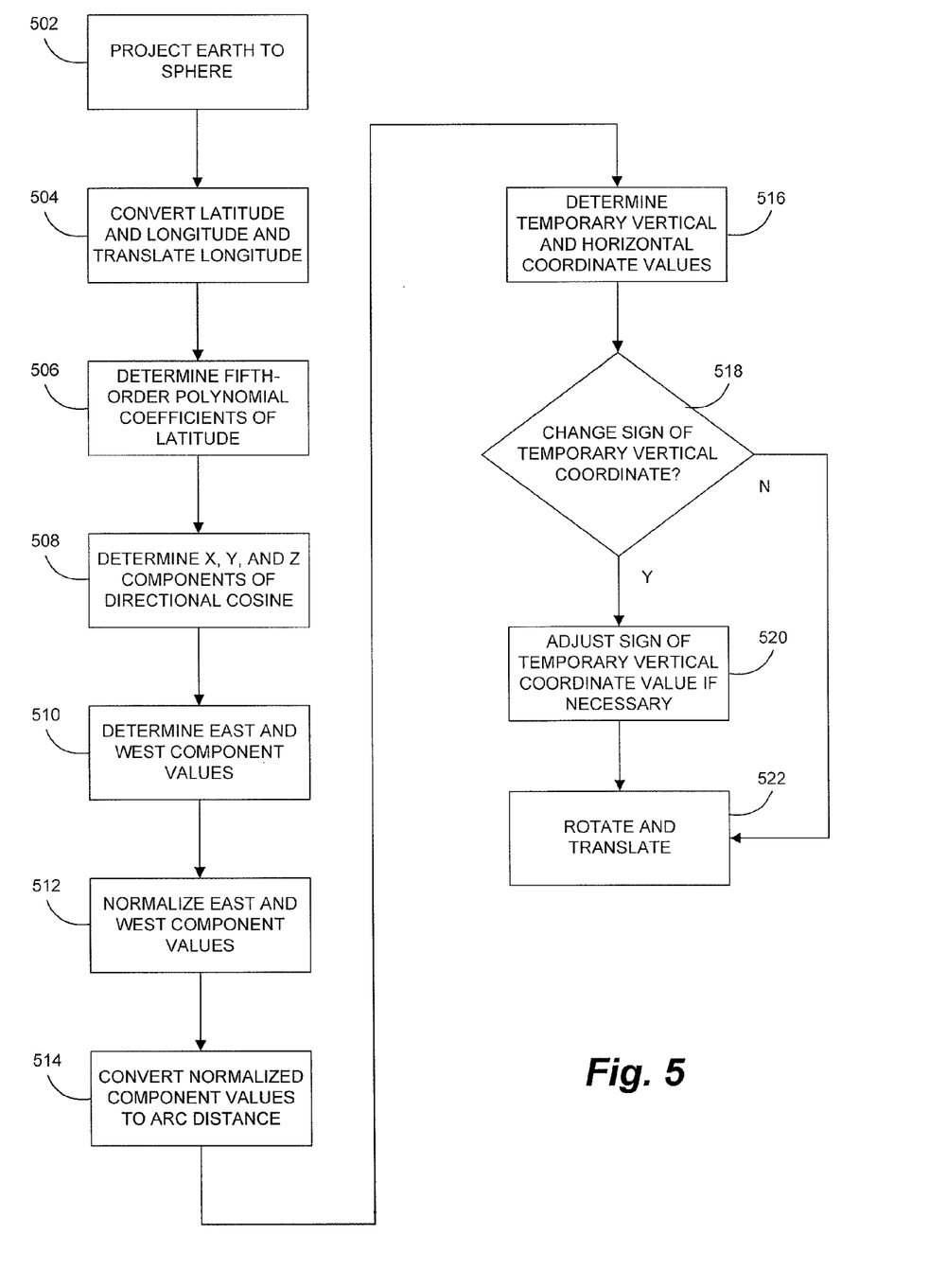
FIG. 5 is a flow diagram of a technique for converting from latitude and longitude to V/H coordinates, according to an embodiment of the invention.

FIG. 5 is a flow diagram showing a technique used to convert from latitude and longitude to V/H coordinates according to an embodiment of the invention. These steps are discussed in detail below, and can be used to convert a customer's physical address to V/H coordinates, for example. The technique shown in FIG. 5 and discussed below are examples, and the order of the illustrated steps, as well as some of the steps themselves, can be changed, depending upon desired functionality of the conversion technique. Using the example of the technique shown in FIG. 5, a location defined by latitude (also expressed below as "rlat") and longitude (also expressed below as "rlong") coordinates in degrees can be converted to vertical (V) and horizontal (H) coordinates, respectively (collectively expressed as "V/H coordinates"). This conversion makes use of a group of coefficients, including: $R_{K1}$, $R_{K2}$, $R_{K3}$, $R_{K4}$, $R_{K5}$, $E_x$, $E_y$, $E_z$, $WW_y$, $W_z$, $P_x$, $P_y$, $P_z$, rot, transV, transH, radius, and pi, the values and definitions of which are shown in the table below.

| Coefficient | Value | Definition |
| --- | --- | --- |
| $R_{K1}$ | 0.99435487 | constant for latitude transformation |
| $R_{K2}$ | 0.00336523 | constant for latitude transformation |
| $R_{K3}$ | −0.00065596 | constant for latitude transformation |
| $R_{K4}$ | 0.00005606 | constant for latitude transformation |
| $R_{K5}$ | −0.00000188 | constant for latitude transformation |
| $E_x$ | 0.40426992 | x-component of the East coefficient |
| $E_y$ | 0.68210848 | y-component of the East coefficient |
| $E_z$ | 0.60933887 | z-component of the East coefficient |
| $W_x$ | 0.65517646 | x-component of the West coefficient |
| $W_y$ | 0.37733790 | y-component of the West coefficient |
| $W_z$ | 0.65449210 | z-component of the West coefficient |
| $P_x$ | −0.555977821730048699 | x-component of coefficient obtained from directional cosine of perpendicular line between E and W values |
| $P_y$ | −0.345728488161089920 | y-component of coefficient obtained from directional cosine of perpendicular line between E and W values |
| $P_z$ | 0.755883902605524030 | z-component of coefficient obtained from directional cosine of perpendicular line between E and W values |
| rot | 76.597497064 | rotation angle, in degrees |
| transV | 6363.235 | amount by which vertical component (V) is translated in feet |
| transH | 2250.700 | amount by which horizontal component (H) is translated in feet |
| radius | 12481.103 | radius of Earth reduced by factor of 0.003, in statute miles |
| pi | 3.14159265358979 | truncated value of $\pi$ |

First, in step 502, the Earth is projected from its ellipsoidal surface to a sphere. According to an embodiment of the invention, this can be accomplished using the routine shown immediately below.

```
set ifrst="0"
if ifrst is "0"
    set ifrst="1"
    set dr=180/pi
    set rotc=cos(rot/dr)
    set rots=sin(rot/dr)
    set rk9=radius*rotc
    set rk10=radius*rots
endif
```

Once the Earth has been projected onto a sphere, the latitude and longitude values are converted to an alternative form for performing calculations, and the longitude value is translated in step 504. According to an embodiment of the invention, the latitude and longitude values are converted to radians, and the longitude is translated by subtracting 52 degrees, as shown below.

$$rlat0 = rlat/dr, rlon1 = (rlong-52)/dr$$

According to an embodiment of the invention, the latitude value (rlat) and the longitude value (rlong) can be input by a user of the price quote system 100 (shown in FIG. 1). Alternatively, the latitude and longitude values of a customer can be determined by the price quote system 100 using other information.

In step 506, the fifth-order polynomial coefficients of the latitude are determined using the converted latitude value found in step 504, as shown below.

set sqla=rlat0*rlat0 set rlat1=rlat0*($R_{K1}$+($R_{K2}$+($R_{K3}$+($R_{K4}$+$R_{K5}$*sqla)*sqla)*sqla)*sqla)

In step 508, the x, y, and z components of the directional cosine of the polynomial coefficient found in step 506 are determined, as shown below.

$$clat = \cos(rlat1)$$

$$x = clat * \sin(rlon1)$$

$$y = clat * \cos(rlon1)$$

$$z = \sin(rlat1)$$

In step 510, the East and West values (E and W, respectively) are determined by multiplying the x, y, and z components determined in step 508 with the corresponding East and West coefficient components $E_x$, $E_y$, $E_z$, $W_x$, $W_y$, $W_z$, as shown below.

$$E = E_x * x + E_y * y + E_z * z$$

$$W = W_x * x + W_y * y + W_z * z$$

In step 512, the East and West values (E and W, respectively) determined in step 510 are normalized, as shown below.

if E<0, set E=0
if W<0, set W=0
if E>1, set E=1
if W>1, set W=1

In step 514, the normalized East and West values (E and W, respectively) are converted to arc distance, as shown below.

$$E = a\cos(E)$$

$$W = a\cos(W)$$

According to an embodiment of the invention, the arc distance to which E and W are converted is expressed in radians.

In step 516, temporary values of the horizontal and vertical coordinates ($H_t$ and $V_t$, respectively) are determined, as shown below.

$$H_t = (E*E - W*W + (0.4)^2)/(2*0.4)$$

$$V_t = \text{sqr}(\text{abs}(E*E - H_t * H_t))$$

According to an embodiment of the invention, the temporary values of the coordinates $H_t$ and $V_t$ are expressed in radians.

In step 518, it is determined whether or not the sign of the temporary vertical coordinate $V_t$ are determined needs to be changed. Specifically, the sign of the temporary vertical coordinate $V_t$ must be positive for calculations in the Northern hemisphere, and negative for calculations performed in the Southern Hemisphere. If it is determined that the sign of $V_t$ does not need to be changed, then rotation and translation is performed in step 522, as discussed below. Otherwise, if the sign of $V_t$ needs to be changed, then the sign is adjusted in step 520 in the manner shown below.

$$Vs = P_x * x + P_y * y + P_z * z$$

if $Vs < 0$, $V_t = -V_t$

In step 522, the temporary values $V_t$ and $H_t$ are rotated and translated to obtain the final V/H coordinates, V and H, respectively, as shown below.

$$V = \text{transV} + rk9 * H_t - rk10 * V_t$$

$$H = \text{transH} + rk10 * H_t + rk9 * V_t$$

FIG. 6 is a table used to output rate quotes according to an embodiment of the invention. The table shown in FIG. 6 can be displayed to a user using the user interface 102 and/or can be transmitted electronically to a user (e.g., via electronic mail, etc.). The table of FIG. 6 can provide, for example, information regarding the type of service offered, any applicable rebates, any installation fees, router costs (e.g., equipment required for service), term of service, total cost, and a link to details of the quote. The link to details of the quote can, for example, provide additional information regarding the quote with which it is associated and/or an opportunity to purchase the service online at the quoted price.

The table shown in FIG. 6 is configured, according to an embodiment of the invention, to allow a user to select and purchase service from a vendor. To this end, the price quotes can be provided in ascending order, beginning with the lowest price. The prices can be highlighted, as shown in FIG. 6 for the user's convenience. A user can select a desired service (e.g., by clicking on the row of the desired service), which can highlight the desired service, as shown in FIG. 6. In the table shown in FIG. 6, for instance, the user has selected the lowest-priced service plan that provides full T1 service, but which does not require a commitment term longer than two years.

According to an embodiment of the invention, customer information and quote information for each customer is stored in a customer quote database 112 (shown in FIG. 1). This information can also be delivered to a representative (e.g., a member of a sales team) for follow-up regarding quoted prices for service plans, selected service plans, or purchased services. The information provided in the table shown in FIG. 6 can be provided in other formats capable of providing the same or similar information.

From the foregoing, it can be seen that the invention provides a system and method to calculate and deliver quotes for distance-sensitive communication links from multiple service providers. The invention can be, however, embodied in other specific forms without departing from the principles thereof. For example, while one or more embodiments of the invention has been described in the context of T1 service plans and their pricing, the invention can employed in other areas according to the principles of the invention set forth herein. For example, any situation in which multiple vendors supply a product and/or service that has distance-sensitive pricing can make use of the present invention to provide real-time quotes to potential customers from the multiple vendors. Additionally, the invention can be used to determine prices from multiple vendors in real-time regardless of whether those prices are distance-sensitive, or dependent upon one or more other parameters.

The presently disclosed embodiments are, therefore, considered in all respects to be illustrative and not restrictive.

What is claimed is:

1. A method, comprising:
receiving information via a communication network in a first format associated with a distance-sensitive communication link of a first service provider, the information associated with the distance-sensitive communication link of the first service provider being received in response to a first service request sent to the first service provider;
receiving information via the communication network in a second format associated with a distance-sensitive communication link of a second service provider, the information associated with the distance-sensitive communication link of the second service provider being received in response to a second service request sent to the second service provider;
converting at least one of the information associated with the distance-sensitive communication link of the first service provider or the information associated with the distance-sensitive communication link of the second service provider into a common format; and
outputting at a display device the information associated with the distance-sensitive communication link of the first service provider in the common format at a first time; and
outputting at the display device the information associated with the distance-sensitive communication link of the second service provider in the common format at a second time substantially the same as the first time.

2. The method of claim 1, wherein:
the converting is at a processor operatively coupled to the communication network.

3. The method of claim 1, further comprising:
storing at a first database the information associated with the distance-sensitive communication link of the first service provider; and
storing at a second database the information associated with the distance-sensitive communication link of the second service provider.

4. The method of claim 1, further comprising:
receiving information in a third format associated with a distance-sensitive communication link of a third service provider, the information associated with the distance-sensitive communication link of the first service provider being received in response to a third service request sent to the third service provider; and
suppressing output of the information associated with the distance-sensitive communication link of the third service provider at the display device based on a user preference associated with the third service provider.

5. The method of claim 1, further comprising:
storing at a database the information associated with the distance-sensitive communication link of the first service provider and the information associated with the distance-sensitive communication link of the second service provider in the common format.

6. The method of claim 1, further comprising:
accessing, before the outputting, the information associated with the distance-sensitive communication link of the first service provider and the information associated with the distance-sensitive communication link of the second service provider at a database.

7. The method of claim 1, wherein:
the information associated with the distance-sensitive communication link of the first service provider includes a first distance-dependent price; and
the information associated with the distance-sensitive communication link of the second service provider includes a second distance-dependent price.

8. A method, comprising:
receiving, at a first time, a data set associated with a distance-sensitive communication link of a first service provider;
receiving, at a second time after the first time, a data set associated with a distance-sensitive communication link of a second service provider;
receiving, at a third time after the second time, a data set associated with a distance-sensitive communication link of a third service provider;
defining a matrix including the data set associated with the distance-sensitive communication link of the first service provider, the data set associated with the distance-sensitive communication link of the second service provider and the data set associated with the distance-sensitive communication link of the third service provider such that the data set associated with the distance-sensitive communication link of the second service provider is located before the data set associated with the distance-sensitive communication link of the first service provider within the matrix; and
displaying to a user a portion of the matrix including at least a portion of the first data set and at least a portion of the second data set such that the third data set is not displayed based on a display preference.

9. The method of claim 8, wherein:
the matrix includes pricing information associated with the distance-sensitive communication link of the first service provider;
the matrix includes pricing information associated with the distance-sensitive communication link of the second service provider; and
the matrix includes pricing information associated with the distance-sensitive communication link of the third service provider.

10. The method of claim 8, wherein:
the data set associated with the distance-sensitive communication link of the first service provider is received in a first data format, the data set associated with the distance-sensitive communication link of the second service provider is received in a second data format, and the data set associated with the distance-sensitive communication link of the third service provider is received in a third data format,
the method further comprising converting, before the defining, the data set associated with the distance-sensitive communication link of the first service provider, the data set associated with the distance-sensitive communication link of the second service provider, and the data set associated with the distance-sensitive communication link of the third service provider into a common data format.

11. The method of claim 8, wherein:
the display preference is stored at a portion of a database, the portion of the database associated with a user profile.

12. The method of claim 8, further comprising:
sending at least a portion of the matrix to a user via a communications network.

13. The method of claim 8, wherein:
the information associated with the distance-sensitive communication link of the first service provider includes a first distance-dependent price; and
the information associated with the distance-sensitive communication link of the second service provider includes a second distance-dependent price.

14. The method of claim 8, wherein:
a first row of the matrix is associated with the distance-sensitive communication link of the first service provider, the first row including a reference to additional information associated with the distance-sensitive communication link of the first service provider; and
a second row of the matrix is associated with the distance-sensitive communication link of the second service provider, the second row including a reference to additional information associated with the distance-sensitive communication link of the second service provider.

15. A method, comprising:
receiving via a communications network, at a first time, information associated with a distance-sensitive communication link of a first service provider in response to a first service request sent to the first service provider;
storing the information associated with the distance-sensitive communication link of the first service provider at a database;
receiving via the communications network customer location information at a second time after the first time;
receiving, after the second time, information associated with a distance-sensitive communication link of a second service provider in response to a second service request sent to the second service provider;
accessing at the database, after the second time, the information associated with the distance-sensitive communication link of the first service provider; and
outputting information based on the information associated with the distance-sensitive communication link of the first service provider and the information associated with the distance-sensitive communication link of the second service provider.

16. The method of claim 15, further comprising:
defining, before the outputting, a matrix including the information associated with the distance-sensitive communication link of the first service provider and the information associated with the distance-sensitive communication link of the second service provider such that pricing information included in the information associated with the distance-sensitive communication link of the first service provider and pricing information included in the information associated with the distance-sensitive communication link of the second service provider are aligned within the matrix.

17. The method of claim 15, further comprising:
calculating at a processor, before the outputting, pricing information associated with the customer location information based on the information associated with the distance-sensitive communication link of the first service provider and the information associated with the distance-sensitive communication link of the second service provider, the pricing information being output during the outputting.

18. The method of claim 15, further comprising:
calculating at a processor, before the outputting, pricing information associated with the customer location information based on the information associated with the distance-sensitive communication link of the first service provider and the information associated with the distance-sensitive communication link of the second service provider, the calculating including determining a distance between a central office to a point of presence of the first service provider and determining a distance between the central office to a point of presence of the second service provider.

19. The method of claim 15, further comprising:
sending at least a portion of the information associated with the distance-sensitive communication link of the first service provider and a portion of the information associated with the distance-sensitive communication link of the second service provider in a common format to a user via the communications network.

20. The method of claim 15, wherein:
the second service request is sent to the second service provider in response to the receiving the customer location information.

\* \* \* \* \*